(12) United States Patent
Qi et al.

(10) Patent No.: US 8,781,383 B2
(45) Date of Patent: *Jul. 15, 2014

(54) FUSER TOPCOAT COMPRISING ELECTROSPUN NON-WOVEN POLYMER NANOFABRICS

(75) Inventors: Yu Qi, Oakville (CA); Carolyn Moorlag, Mississauga (CA); Qi Zhang, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 248 days.

This patent is subject to a terminal disclaimer.

(21) Appl. No.: 13/040,665

(22) Filed: Mar. 4, 2011

(65) Prior Publication Data

US 2012/0224897 A1 Sep. 6, 2012

(51) Int. Cl.
*G03G 15/20* (2006.01)

(52) U.S. Cl.
USPC .......................................................... 399/333

(58) Field of Classification Search
USPC .......................................................... 399/333
See application file for complete search history.

(56) References Cited

U.S. PATENT DOCUMENTS

| | | | | |
|---|---|---|---|---|
| 4,887,340 A * | 12/1989 | Kato et al. | ........... | 492/53 |
| 5,718,835 A * | 2/1998 | Momose et al. | ........... | 252/73 |
| 2001/0008914 A1 * | 7/2001 | Osawa et al. | ........... | 524/188 |
| 2001/0019768 A1 * | 9/2001 | Kaplan et al. | ........... | 428/391 |
| 2002/0022138 A1 * | 2/2002 | Maeyama et al. | ........... | 428/457 |
| 2003/0137069 A1 * | 7/2003 | Reneker | ........... | 264/29.1 |
| 2003/0144103 A1 * | 7/2003 | Battat et al. | ........... | 474/254 |
| 2006/0057377 A1 * | 3/2006 | Harrison et al. | ........... | 428/364 |
| 2006/0292360 A1 * | 12/2006 | Hays et al. | ........... | 428/323 |
| 2006/0292369 A1 | 12/2006 | Rutledge et al. | | |
| 2007/0048521 A1 * | 3/2007 | Istvan | ........... | 428/367 |
| 2007/0148438 A1 * | 6/2007 | Pickering et al. | ........... | 428/327 |
| 2007/0166464 A1 * | 7/2007 | Acatay et al. | ........... | 427/346 |
| 2007/0298235 A1 * | 12/2007 | Yoshida et al. | ........... | 428/294.7 |
| 2009/0032475 A1 * | 2/2009 | Ferrer et al. | ........... | 210/799 |
| 2009/0042029 A1 * | 2/2009 | Havel et al. | ........... | 428/372 |
| 2009/0246592 A1 * | 10/2009 | Kinoshita | ........... | 429/33 |
| 2009/0257796 A1 * | 10/2009 | Colvin et al. | ........... | 399/336 |
| 2010/0137499 A1 * | 6/2010 | Moorlag et al. | ........... | 524/496 |
| 2010/0151245 A1 * | 6/2010 | Law et al. | ........... | 428/375 |
| 2012/0208421 A1 * | 8/2012 | Qi et al. | ........... | 442/334 |
| 2012/0225602 A1 * | 9/2012 | Qi et al. | ........... | 442/365 |

FOREIGN PATENT DOCUMENTS

JP    02020890 A  *  1/1990

OTHER PUBLICATIONS

Fukushima et al., "Preparation of ultrafine uniform electrospun polyimide nanofiber", Poylmer Journal 2010, vol. 42, pp. 514-518.

* cited by examiner

*Primary Examiner* — David Gray
*Assistant Examiner* — Tyler Hardman
(74) *Attorney, Agent, or Firm* — MH2 Technology Law Group LLP

(57) ABSTRACT

Exemplary embodiments provide materials and methods for a non-woven fabric, a fuser member, and a fusing apparatus used in electrophotographic printing devices, wherein the non-woven fabric can be at least part of the topcoat layer of the fuser member and can include a plurality of non-woven electrospun fibers bonded with a fluoropolymer.

8 Claims, 7 Drawing Sheets

FUSER TOPCOAT COMPRISING ELECTROSPUN NON-WOVEN POLYMER NANOFABRICS

DETAILED DESCRIPTION

1. Field of the Use

The present teachings relate generally to fuser members used in electrophotographic printing devices and, more particularly, to a non-woven fabric material used as the topcoat layer of the fuser members.

2. Background

In a typical electrophotographic reproducing apparatus, a light image of an original to be copied is recorded in the form of an electrostatic latent image upon a photosensitive member. The latent image is subsequently rendered visible by application of electroscopic thermoplastic resin particles which are commonly referred to as toner. The visible toner image is then in a loose powdered form and is usually fused, using a fusing apparatus, upon a support, which may be an intermediate member, or a print medium such as plain paper.

Conventional fusing apparatuses include a fuser member and a pressure member, which may be configured to include a roll pair maintained in pressure contact or a belt member in pressure contact with a roll member. In a fusing process, heat may be applied by heating one or both of the fuser member and the pressure member.

Conventional fusing technologies include application of fuser oils to the fuser member during the fusing operation, in order to maintain good releasing properties of the fuser member. On the other hand, conventional fusing technologies include an oil-less fusing process, which removes the oil application step from the fusing operations. The oil-less fusing operations have been used for color printers and multi-functional copier-printers in small office and home office market but not for all high speed products.

Additionally, paper-edge wear and scratch damage at the fuser surface are often observed during conventional fusing operations, due to lack of mechanical robustness of the topcoat materials used for conventional fuser members.

To lower manufacturing costs and extend lifetime of conventional fuser members, it is desirable to provide a fuser material with improved surface releasing properties and/or mechanical robustness.

SUMMARY

According to various embodiments, the present teachings include a fuser member. The fuser member can include a substrate, and a topcoat layer disposed over the substrate. The topcoat layer can include a non-woven fabric material formed of a plurality of entangled electrospun fibers that are bonded with a fluoropolymer. The topcoat layer can have a surface energy of about 25 mN/m or less.

According to various embodiments, the present teachings also include a fusing apparatus. The fusing apparatus can include a fuser member having a topcoat layer. The topcoat layer can include a non-woven fabric material formed of a plurality of entangled electrospun fibers which are bonded with a fluoropolymer. The fusing apparatus can also include a pressure member configured to form a contact nip with the topcoat layer of the fuser member to fuse toner images on a print medium that passes through the contact nip. The topcoat layer of the fuser member can have a tensile strength of at least about 5000 psi and a surface energy less than about 25 mN/m for providing an oil-less fusing of the toner images on the print medium. In embodiments, the topcoat layer can provide the fused toner images on the print medium with a G75 gloss level ranging from about 10 ggu to about 60 ggu.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1A:
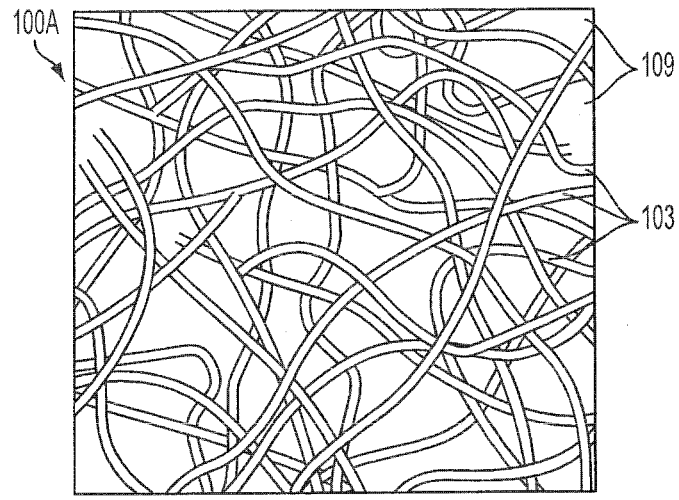
FIGS. 1A-1B depict exemplary electrospun layers in accordance with various embodiments of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for a non-woven fabric, a fuser member, and a fusing apparatus used in electrophotographic printing devices. The non-woven fabric can include an electrospun layer having a plurality of pores formed by a plurality of non-woven electrospun fibers and a filler polymer disposed within the plurality of pores of the electrospun layer to bond the electrospun fibers. In one embodiment, the non-woven fabric can be used as at least a portion of a topcoat layer of a fuser member to provide desirable properties suitable for the fusing processes.

As disclosed herein, the term "non-woven fabric" refers to a bonded sheet or a bonded web formed by entangling fibers or filaments or perforating films together. The bonding in the non-woven fabric can be a mechanical, thermal, and/or chemical bonding. Note that the non-woven fabrics are not made by weaving or knitting and do not require converting the fibers to yarn. The non-woven fabrics can be substantially flat and/or porous. For example, the non-woven fabrics can be formed by an electrospinning process and/or can be in nano-scale.

As disclosed herein, the non-woven fabrics can further include filler polymers (e.g., fluoropolymers) to bond the electrospun fibers. The electrospun fibers can be entangled. The electrospun fibers can have porous structures. For example, the filler polymers can be disposed within the porous structures of an exemplary electrospun layer. The entangled electrospun fibers can be made of an organic, an inorganic material, or a combination thereof. In embodiments, the electrospun layer can include polymers, ceramics, glass, metal-containing materials, such as sol-gel type metal oxides, semiconductors such as silicon, or other suitable materials that can be formed by electrospinning process. In certain embodiments, the electrospun layer can be formed by a tough polymer such as Nylon and the filler polymer can be a low-surface-energy polymer such as a fluoropolymer.

Figure 1B:
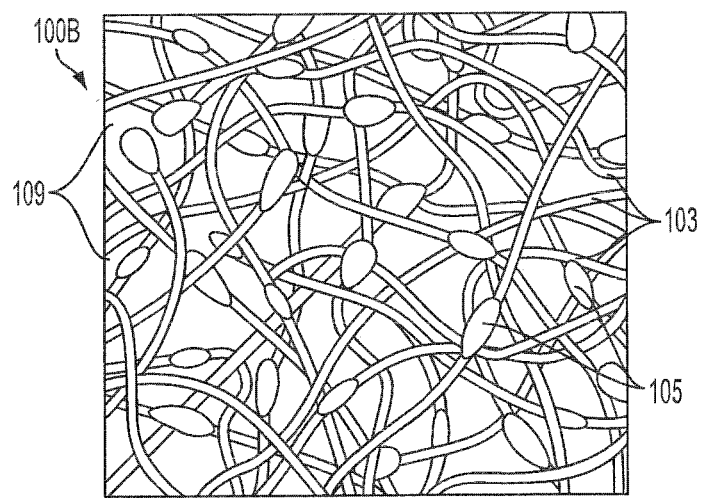

FIGS. 1A-1B depict exemplary electrospun layers 100A-B in accordance with various embodiments of the present teachings. Specifically, in FIG. 1A, the electrospun layer 100A can be formed by entangling an electrospun fiber 103 to form, for example, a fiber-on-fiber type of structure. In FIG. 1B, the electrospun layer 100B can be formed by entangling an electrospun fiber 103 that has one or more electrospun beads 105 formed on surfaces of the electrospun fiber 103 and/or embedded, partially or wholly, within the electrospun fiber 103. The electrospun layer 100B can thus have a bead-on-fiber type of structure. The electrospun fiber 103 and/or the electrospun beads 105 can be generated during the electrospinning process. As used herein, the term "electrospun fiber" can also be referred to as "non-woven electrospun fiber."

In embodiments, the electrospun beads 105 can have an average size ranging from about 50 nm to about 10 µm, or from about 500 nm to about 8 µm, or from about 100 nm to about 5 µm.

The electrospun layers 100A-B can be porous having a porosity ranging from about 10% to about 99%, or from about 50% to about 95%, or from about 60% to about 80%. In embodiments, the porous structures or pores 109 of the electrospun layers 100A-B can have an average pore size in a range from about 50 nm to about 50 µm, or from about 100 nm to about 10 µm, or from about 500 nm to about 5 µm.

Figure 2A:
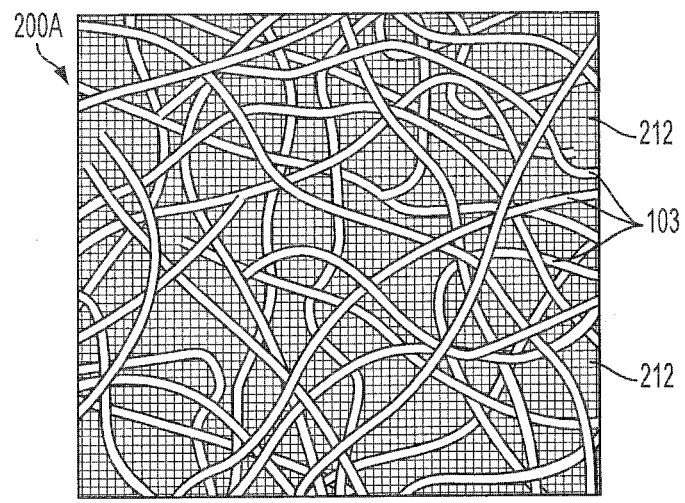
FIGS. 2A-2B depict exemplary non-woven fabrics by incorporating a filler polymer into the exemplary electrospun layers of FIGS. 1A-1B in accordance with various embodiments of the present teachings.
Figure 2B:
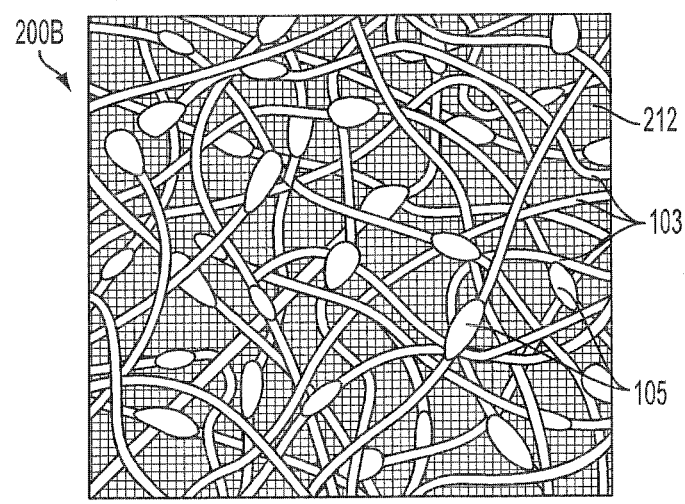

FIGS. 2A-2B depict exemplary non-woven fabrics 200A-B in accordance with various embodiments of the present teachings. In embodiments, the exemplary non-woven fabrics 200A-B can include an electrospun layer, e.g., the electrospun layers 100A-B as depicted in FIGS. 1A-1B, and a filler polymer 212. For example, the filler polymer 212 can be disposed within the pores 109 of the electrospun layer 100A-B. In embodiments, the filler polymers 212 can partially or wholly fill the pores 109 to bond the electrospun fibers 103 to form a polymer matrix of the non-woven fabrics 200A-B.

The exemplary non-woven fabrics can be formed by first forming the electrospun layer 100A/B using a conventional electrospinning process to produce continuous, micron/nanometer diameter fibers (see 103 in FIGS. 1A-1B), which can then be spun into a non-woven textile or a non-woven fabric.

For example, a solid electrospun fiber can be generated by an electrified jet, e.g., including a highly viscous polymer solution, and can be continuously stretched due to electrostatic repulsions between the surface charges and the solvent evaporation of the polymer solution. The electrospun fibers can provide a long length, an ultrathin diameter, and capability of being aligned on the molecular level. As such, an electrospinning setup can include at least three components: a high-voltage power supply, a spinneret, and a fiber collector. The resulting electrospun layer can possess many exceptional properties, such as, for example, high mechanical strength, high surface area, and other tunable mechanical, surface, electrical, thermal, and/or chemical properties, depending on the selection of the polymers and morphology of the generated electrospun fibers/layers. In embodiments, the electrospun layers 100A-B can include the electrospun layers as described in U.S. patent application Ser. No. 11/371,223 and Ser. No. 12/335,933, the disclosures of which are incorporated herein by reference in their entirety.

Various materials can be used as electrospun materials to form the electrospun fibers including, but not limited to, polymers, ceramics, composites, and/or the combinations thereof. Suitable synthetic and/or natural materials can be used.

Exemplary materials used for forming the electrospun fibers can include polyamide such as aliphatic and/or aromatic polyamides, polyester, polyimide, polycarbonate, polyurethane, polyether, polyoxadazole, polybenzimidazole, polyacrylonitrile, polycaprolactone, polyethylene, polypropylene, acrylonitrile butadiene styrene (ABS), polybutadiene, polystyrene, polymethyl-methacrylate (PMMA), polyhedral oligomeric silsesquioxane (POSS), poly(vinyl alcohol), poly(ethylene oxide), polylactide, poly(caprolactone), poly(ether imide), poly(ether urethanes), poly(ester urethanes), poly(p-phenylene terephthalate), cellulose acetate, poly(vinyl acetate), poly(acrylic acid), polyacrylamide, polyvinylpyrrolidone, hydroxypropylcellulose, poly(vinyl butyral), poly(alkly acrylates), poly(alkyl meth acrylates), polyhydroxybutyrate, fluoropolymer, poly(vinylidene fluoride), poly(vinylidene fluoride-co-hexafluoropropylene), fluorinated ethylene-propylene copolymer, poly(tetrafluoroethylene-co-perfluoropropyl vinyl ether), poly((perfluoroalkyl)ethyl methacrylate), cellulose, chitosan, gelatin, protein, and/or mixtures thereof. In embodiments, the electrospun fibers can be formed of a tough polymer such as Nylon, polyimide, and/or other tough polymers.

In embodiments, the entangled electrospun fibers can have a diameter ranging from about 5 nm to about 50 µm, or ranging from about 50 nm to about 20 µm, or ranging from about 100 nm to about 1 µm. In embodiments, the electrospun fibers can have an aspect ratio about 100 or higher, e.g., ranging from about 100 to about 1,000, or ranging from about 100 to about 10,000, or ranging from about 100 to about 100,000. In embodiments, the non-woven fabrics can be non-woven nano-fabrics formed by electrospun nanofibers having at least one dimension, e.g., a width or diameter, of less than about 1000 nm, for example, ranging from about 5 nm to about 500 nm, or from 10 nm to about 100 nm.

Because of the high surface-to-volume ratio of the electrospun nanofibers, the interaction between the electrospun nanofibers and the filler polymers can be significantly increased, leading to better mechanical reinforcement than conventional fibers. Additionally, the electrospun nanofibers can be ultra-fine and can provide a high weight loading in the resulting non-woven nanofabrics. Further, due to use of the electrospun nanofibers, the formed non-woven nanofabrics can have uniform, well-controlled surface morphology, e.g., for providing ultra-low surface energy useful for oil-less fusing processes. Furthermore, the resulting non-woven nanofabrics can provide tunable properties including but not limited to mechanical robustness, surface properties, and/or electrical-, thermal-, and/or chemical properties.

Following formation of the electrospun layers 100A-B, the non-woven fabrics 200A-B can be formed by, e.g., casting a homogeneous solution containing one or more filler polymers onto the formed electrospun layer. This can be followed by a solidifying process, e.g., a drying or curing process, to remove the solvent of the homogenous solution, thereby leaving the solidified filler polymers (see 212 of FIGS. 2A-2B) within the pores 109 of the electrospun layers 100A-B. The casting process can include any suitable casting processes known to one of ordinary skill in the art.

In some cases, the selected filler polymers may not form a homogeneous solution, but may be in a form of particles or powders contained in a heterogeneous dispersion. The heterogeneous dispersion can then be cast onto the electrospun layers 100A-B, followed by a solidifying process to remove the dispersion solvent. In addition, a melting process can be used to at least partially melt the particles or powders of the filler polymers. The melted filler polymers (see 212 in FIGS. 2A-2B) can then be dispersed within the pores 109 of the electrospun layers 100A-B to form the disclosed non-woven fabrics 200A-B.

In other cases, particles or powders of filler polymers can be applied directly to the electrospun layer 100A-B without using a dispersion solvent, but using a melting process. The applied filler polymer particles can thus be melted into the pores 109 of the electrospun layer 100A-B to form the disclosed non-woven fabrics 200A-B.

In embodiments, the filler polymers 212 can include, but are not limited to, fluoropolymers, silicone elastomers, thermoelastomers, resin, and/or combinations thereof.

Suitable fluoropolymers can include fluoroplastics, fluoroelastomers, and/or fluororesins. For example, the fluoropolymer can include one or more repeating units each corresponding to a monomer. The monomer can include, e.g., tetrafluoroethylene (TFE), hexafluoropropylene (HFP), perfluoropropyl vinyl ether (PPVE), perfluoroethyl vinyl ether (PEVE), perfluoromethyl vinyl ether (PMVE), chlorotrifluoroethylene (CTFE), vinyl fluoride (VF), and vinylidene fluoride (VDF), and a combination thereof. In an additional example, the fluoropolymers can be selected from the group consisting of polytetrafluoroethylene (PTFE), perfluoroalkoxy polymer resin (PFA), fluorinated ethylenepropylene copolymer (FEP), copolymers of tetrafluoroethylene (TFE) and hexafluoropropylene (HFP), copolymers of hexafluoropropylene (HFP) and vinylidene fluoride (VDF), terpolymers of tetrafluoroethylene (TEE), vinylidene fluoride (VDF), and hexafluoropropylene (HFP), and tetrapolymers of tetrafluoroethylene (TFE), vinylidene fluoride (VF2), hexafluoropropylene (HFP) and a combination thereof.

Additionally, commercially available fluoroplastics can include those from various designations, such as TEFLON® PFA, TEFLON® PTFE, or TEFLON® FEP available from E.I. DuPont de Nemours, Inc. (Wilmington, Del.).

Commercially available fluoroelastomers can include, for example, VITON® A: copolymers of HFP and VDF (or VF2); VITON® B: terpolymers of TEE, VDF and HFP; VITON® GF: tetrapolymers of TFE, VF2, HFP; as well as VITON® E; VITON® E-60C; VITON® E430; VITON® 910; VITON® GH; and VITON® GF. The VITON® designations are Trademarks of E.I. DuPont de Nemours, Inc. (Wilmington, Del.). Other commercially available fluoroelastomers can include those available from 3M Corporation (St. Paul, Minn.) including, for example, DYNEON™ fluoroelastomers, AFLAS® fluoroelastomers (e.g., a poly(propylene-tetrafluoroethylene)), and FLUOREL® fluoroelastomers (e.g. FLUOREL® II (e.g., LII900) a poly(propylene-tetrafluoroethylenevinylidenefluoride), FLUOREL® 2170, FLUOREL® 2174, FLUOREL® 2176, FLUOREL® 2177, and/or FLUOREL® LVS 76. Additional commercially available fluoroelastomer materials can include the "tecnoflons" identified as FOR®-60KIR, FOR®-LHF, FOR®-NM, FOR®-THF, FOR®-TFS, FOR®-TH, and FOR®-TN505, available from Solvay Solexis (West Deptford, N.J.).

In embodiments, the filler polymers can include materials used for forming the electrospun fibers, and vice versa. The materials used for the electrospun fibers and the filler polymers can be the same or different. Additionally, by selecting suitable combination of materials and/or amounts of electrospun polymers, filler polymers and/or other additive materials, the properties of the resulting non-woven fabrics 200A-B can be adjusted or controlled as desired.

In embodiments, the non-woven fabrics 200A-B can further include an additive material including silica, clay, metal oxides nanoparticles, carbon nanotubes, carbon nanofibers, etc.

For example, the non-woven electrospun fibers 103 can have a concentration from about 5% to about 99%, or from about 5% to about 95%, or from about 10% to about 90% by weight of the total non-woven fabrics.

The non-woven fabrics/nanofabrics 200A-B can have desirable surface energy, for example, a surface energy of about 25 mN/m or less, or ranging from about 1 mN/m to about 20 mN/m, or from about 5 mN/m to about 15 mN/m, or from about 8 mN/m to about 12 mN/m. This low surface energy can control surface release performance of the non-woven fabrics/nanofabrics. For example, when the non-woven fabrics/nanofabrics are used, at least partially, as a topcoat layer of a fuser member in an electrophotographic printing device, an oil-less fusing process can be performed.

The non-woven fabrics/nanofabrics 200A-B can provide desirable mechanical properties to the topcoat layer. For example, the non-woven fabrics/nanofabrics 200A-B can have a tensile strength of at least about 5,000 psi, e.g., ranging from about 5,000 psi to about 500,000 psi, or from about 6,000 psi to about 9,000 psi, or from about 7,000 psi to about 8,000 psi; an elongation % of at least about 30% or at least about 50%, e.g., ranging from about 100% to about 600%, or from about 100% to about 500% or from about 200% to about 400%; a toughness of at least about 5,000 in.-lbs./in.$^3$, e.g., ranging from about 5,000 in.-lbs./in.$^3$ to about 500,000 in.-lbs./in.$^3$, or from about 6,000 in.-lbs./in.$^3$ to about 9,000 in.-lbs./in.$^3$, or from about 7,000 in.-lbs./in.$^3$ to about 8,000 in.-lbs./in.$^3$; and an initial modulus of at least about 1,000 psi, e.g., ranging from about 1,000 psi to about 8,000 psi, or ranging from about 2,000 psi to about 7,000 psi, or ranging from about 3,000 psi to about 6,000 psi.

In embodiments, the non-woven fabrics/nanofabrics 200A-B can be used in any suitable electrophotographic members and devices. For example, the non-woven fabrics/nanofabrics 200A-B can be used at least partially as a topcoat layer for a printer member in electrophotographic devices including, but not limited to, a fuser member, a pressure member, and/or a donor member. The topcoat layer can have a thickness ranging from about 5 µm to about 250 µm, or from about 10 µm to about 200 µm, or from about 20 µm to about 150 µm.

The printer member can be in a form of, for example, a roll, a drum, a cylinder, or a roll member as shown in FIGS. 3A-3B and FIGS. 4A-4B. In some embodiments, the printer member can be in a form of a belt, a drelt, a plate, a sheet, or a belt member as shown in FIGS. 5A-5B and FIGS. 6A-6B.

Figure 3A:
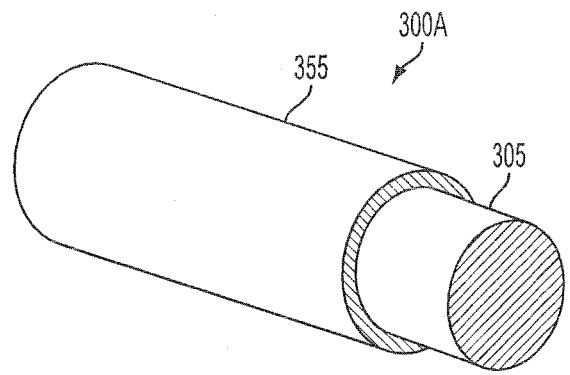
FIGS. 3A-3B depict exemplary fuser rolls having the exemplary non-woven fabrics in FIGS. 2A-2B in accordance with various embodiments of the present teachings.
Figure 3B:
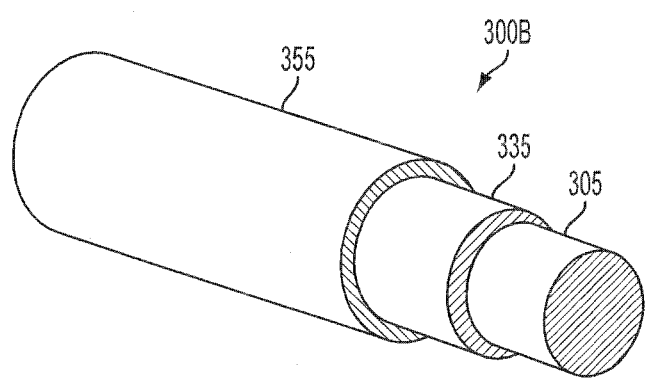

Referring to FIGS. 3A-3B, the fuser member 300A-B can include a substrate 305 and a topcoat layer 355 formed over the substrate 305. The topcoat layer 355 can include, for example, the non-woven fabrics/nanofabrics 200A-B as shown in FIGS. 2A-2B.

In embodiments, the substrate 305 can be a cylindrical substrate taking the form of a cylindrical tube, e.g., having a hollow structure including a heating lamp therein, or a solid cylindrical shaft. The substrate 305 can be made of a material including, but not limited to, a metal, a polymer (e.g., plastic), and/or a ceramic. For example, the metal can include aluminum, anodized aluminum, steel, nickel, and/or copper. The plastic can include, for example, polyimide, polyester, polyketone such as polyetheretherketone (PEEK), poly(arylene ether), polyamide, polyaramide, polyetherimide, polyphthalamide, polyamide-imide, polyphenylene sulfide, fluoropolyimide and/or fluoropolyurethane.

The topcoat layer 355 can be formed directly on the substrate 305 as exemplarily shown in FIG. 3A. In various embodiments, one or more additional functional layers, depending on the member applications, can be formed between the topcoat layer 355 and the substrate 305. For example, the member 300B can have a 2-layer configuration having a compliant/resilient layer 335, such as a silicone rubber layer, disposed between the topcoat layer 355 and the substrate 305. In another example, the exemplary fuser member can include an adhesive layer (not shown), for example, formed between the resilient layer 335 and the substrate 305 or between the resilient layer 335 and the topcoat layer 355.

Figure 4A:
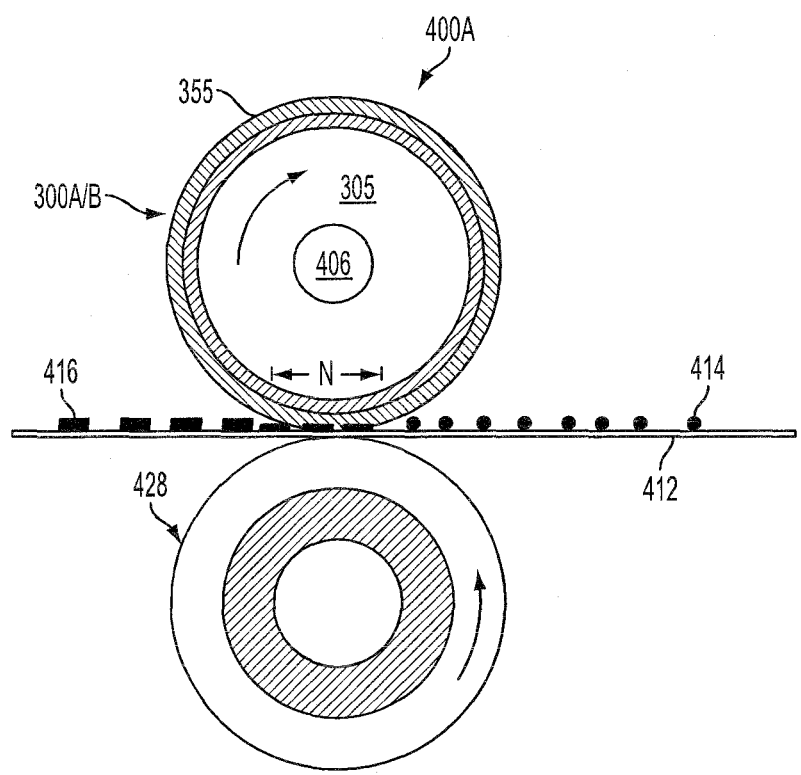
FIGS. 4A-4B depict exemplary fusing apparatuses having the fuser rolls of FIGS. 3A-3B in accordance with various embodiments of the present teachings.
Figure 4B:
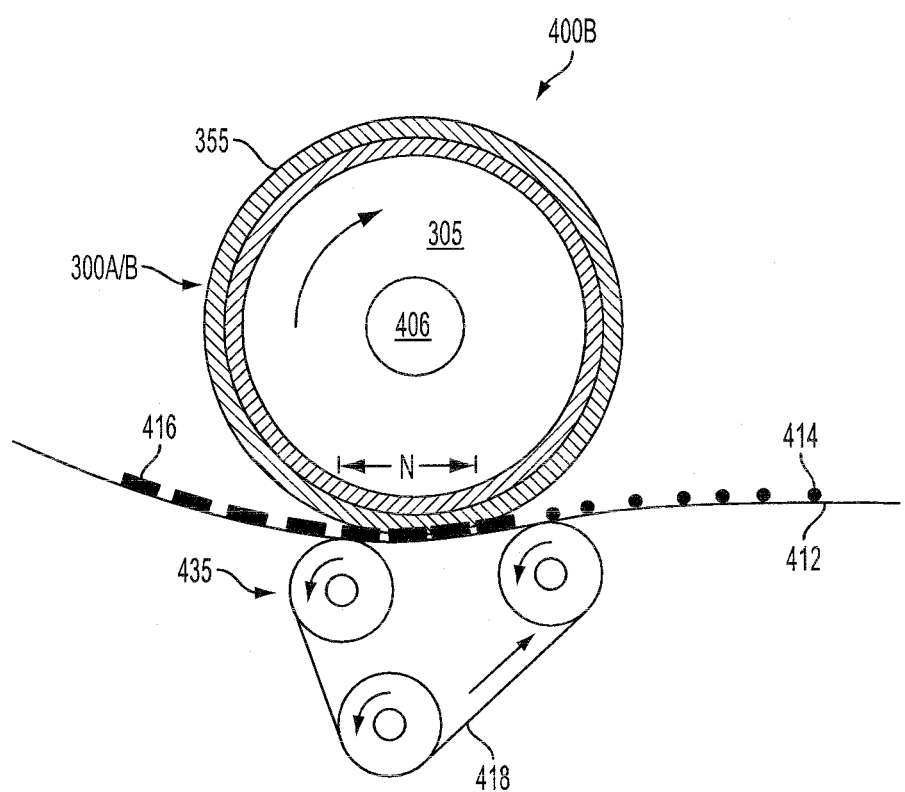

As disclosed herein, the exemplary fuser member 300A-B can be used in a conventional fusing system to improve fusing performances. FIGS. 4A-4B depict exemplary fusing apparatuses 400A-B using the disclosed member 300A or 300B of FIGS. 3A-3B.

The exemplary fusing apparatuses 400A-B can include the exemplary fuser member 300A/B having a topcoat layer 355 over a suitable substrate 305, e.g., a hollow cylinder fabricated from any suitable metal. The fuser member 300A/B can further be incorporated with a suitable heating element 406 disposed in the hollow portion of the substrate 305 which is coextensive with the cylinder. Backup (or pressure) roll 428 (see FIG. 4A) or a backup (or pressure) belt 418 (see FIG. 4B) can cooperate with the fuser member 300A/B to form a contact nip N through which a print medium 412 such as a copy paper or other print substrate passes, such that toner images 414 on the print medium 412 contact the topcoat layer 355 during the fusing process. The mechanical component 435 can include one or more rolls cooperated to move the pressure belt 418. The fusing process can be performed at a temperature ranging from about 60° C. (140° F.) to about 300° C. (572° F.), or from about 93° C. (200° F.) to about 232° C. (450° F.), or from about 160° C. (320° F.) to about 232° C. (450° F.). Following the fusing process, after the print medium 412 passing through the contact nip N, fused toner images 416 can be formed on the print medium 412.

Figure 5A:
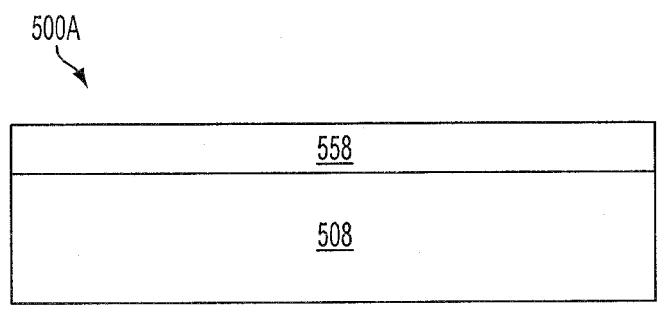
FIGS. 5A-5B depict exemplary fuser belts having the exemplary non-woven fabrics in FIGS. 2A-2B in accordance with various embodiments of the present teachings.
Figure 5B:
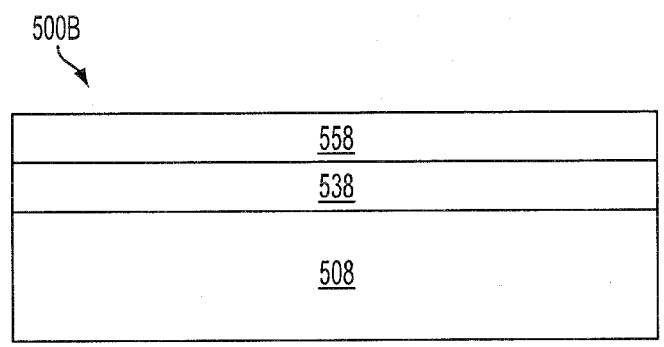

In embodiments, the fuser member can be a fuser belt having a topcoat layer 558 formed over a belt substrate 508 as shown in FIGS. 5A-5B. As described herein, the topcoat layer 558 can include the non-woven fabrics/nanofabrics 200A-B.

Compared with the fuser rolls 300A-B shown in FIGS. 3A-3B, the fuser belts 500A-B can have the belt substrate 508. The belt substrate 508 can be any suitable belt substrate as known to one of ordinary skill in the art. For example, the belt substrate 508 can include high temperature plastics that are capable of exhibiting a high flexural strength and high flexural modulus. The belt substrate 508 can alternatively include a film, sheet, or the like and can have a thickness ranging from about 25 micrometers to about 250 micrometers. The belt substrate 508 can include, for example, polyimide, polyester, polyketone such as polyetheretherketone (PEEK), poly(arylene ether), polyamide, polyaramide, polyetherimide, polyphthalamide, polyamide-imide, polyphenylene sulfide, fluoropolyimide and/or fluoropolyurethane.

Figure 6B:
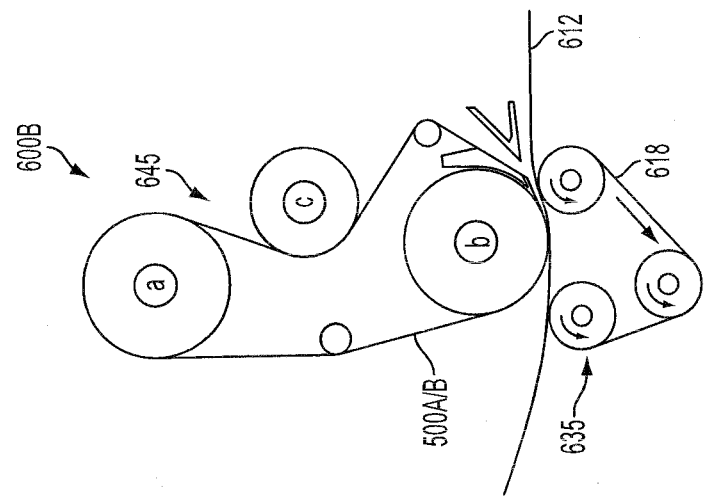
FIGS. 6A-6B depict exemplary fusing apparatuses having the fuser belts of FIGS. 5A-5B in accordance with various embodiments of the present teachings.
Figure 6A:
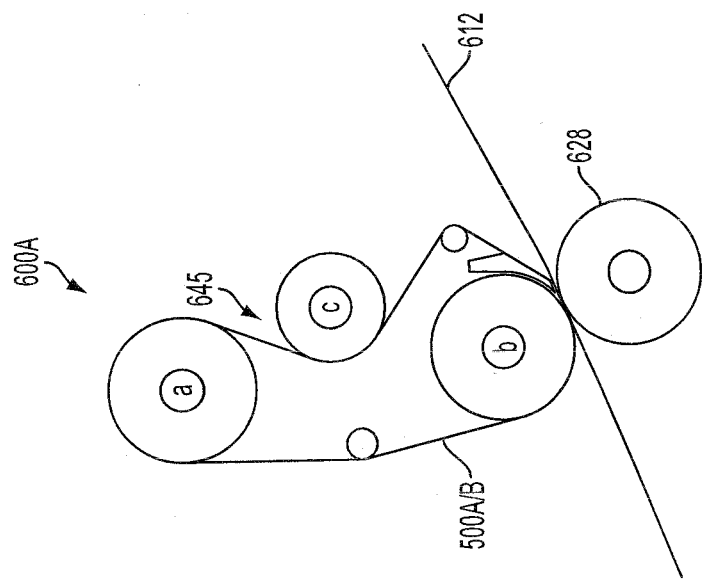

FIGS. 6A-6B depict exemplary fusing apparatuses 600A-B using the fuser belt shown in FIGS. 5A-5B in accordance with various embodiments of the present teachings. The apparatus 600A/B can include a fuser belt 500A/B that forms a contact nip with, for example, a pressure roll 628 in FIG. 6A of a pressure belt 618 of FIG. 6B. A print medium 612 having unfixed toner images (not illustrated) can then pass through the contact nip N to fuse the unfixed toner images on the printer medium 612. In embodiments, the pressure roll 628 or the pressure belt 618 can be used in a combination with a heat lamp to provide both the pressure and heat for fusing the toner images on the print medium 612. In addition, the apparatus 600A/B can include a mechanical component 645 to move the fuser belt 500A/B and thus fusing the toner images and forming images on the print medium 612. The mechanical component 645 can include one or more rolls 645a-c, which can also be used as heat rolls when needed.

In embodiments, due to use of the non-woven fabric material as the topcoat layer of the fuser and/or pressure members in the fusing apparatus as disclosed herein, images fused on the print medium (see 412 in FIGS. 4A-4B and 612 in FIGS. 6A-6B) can have a desirable gloss level.

Surface gloss level of a print having fused images on a print medium can be measured by a digital high-precision glossmeter (manufactured by Murakami Color Research Laboratory Co., Ltd.) at an incident angle of 75°. The measured gloss level is therefore referred to as G75 gloss level, as known to one of ordinary skill in the art. For comparison, images fused by conventional fusing apparatuses can have an undesirable G75 gloss level of greater than about 80 ggu.

In embodiments, images fused using the disclosed fusing materials and apparatus can have a G75 gloss level ranging from about 5 ggu to about 80 ggu, or ranging from about 10 to about 60 ggu, or ranging from about 10 to about 50 ggu.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

EXAMPLES

Fabrication of a Fuser Topcoat with Electrospun Non-Woven Polyimide Fabrics

A fuser topcoat was made by depositing an electrospun non-woven polyimide fabric on a metal roll having molded silicone, followed by coating a PFA aqueous dispersion thereon. The formation of the electrospun non-woven polyimide fabric was similar to that described in a journal article, see J. Appl. Poly. Sci. 57, 789-795 (1995), which is hereby incorporated by reference in its entirety.

Polyimide fibers about 50-300 nm in diameter can be prepared by electrospinning a 6FDA-6FAP polyimide (see scheme 1 for the chemical structure) solution in dimethyl formamide.

Scheme 1

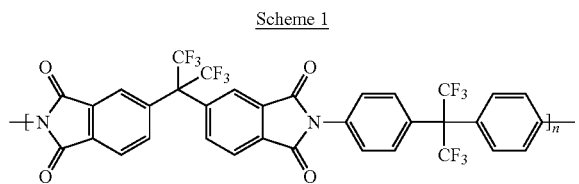

During the electrospinning process, the distance between the spinneret and the grounded plate was from about 25 cm to about 5 cm; the polyimide concentration was from about 9 wt % to about 20 wt %; and the voltage between the syringe and the collector was from about 15 kv to about 30 kv. The polyimide fibers were laid over a support material to form a layer of non-woven fabric. The fabrics layer was then detached from the support material and applied to the molded silicone of the exemplary fuser roll.

An aqueous dispersion of PFA was then spray-coated onto the fabric layer of the fuser roll, followed by a heating process to the PFA melting temperature (e.g. >310° C.) to fill PFA into the fabrics and thus to form an exemplary fuser topcoat layer.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A fuser member comprising:
a substrate, and
a topcoat layer disposed over the substrate, the topcoat layer comprising a fabric material comprising (a) a plurality of entangled electrospun fibers forming a porous, non-woven fibrous layer; and (b) a fluoropolymer dispersed within the pores of the non-woven fibrous layer so as to form a fluoropolymer matrix bonding the fibers together, wherein the fluoropolymer comprises perfluoroalkoxy polymer resin (PFA), and wherein the topcoat layer has a surface energy of about 25 mN/m or less, and wherein the entangled electrospun fibers comprise polyimide and have at least one dimension that is less than 1000 nm.

2. The member of claim 1, wherein the plurality of entangled electrospun fibers are present in an amount ranging from about 5% to about 95% by weight of the total topcoat layer.

3. The member of claim 1, wherein each of the plurality of entangled electrospun fibers has an aspect ratio of about 100 or higher.

4. The member of claim 1, wherein each of the plurality of entangled electrospun fibers has a diameter in the range of about 5 nm to about 50 μm.

5. The member of claim 1, wherein the topcoat layer further comprises an additive selected from the group consisting of silica, clay, metal oxides, nanoparticles, and a combination thereof.

6. The member of claim 1, wherein the topcoat layer has a tensile strength at least about 5,000 psi, an elongation % at least about 30%, and a toughness at least about 5,000 in.-lbs./in.$^3$.

7. The member of claim 1, wherein the topcoat layer has a thickness ranging from about 5 μm to about 250 μm.

8. The member of claim 1, wherein the substrate is a roll substrate or a belt substrate.

* * * * *